(12) United States Patent
Smith

(10) Patent No.: US 8,385,005 B2
(45) Date of Patent: Feb. 26, 2013

(54) LENS STRUCTURE HAVING LOW PASS FILTER CHARACTERISTIC

(75) Inventor: George E. Smith, Sunnyvale, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 102 days.

(21) Appl. No.: 13/029,419

(22) Filed: Feb. 17, 2011

(65) Prior Publication Data

US 2012/0212837 A1  Aug. 23, 2012

(51) Int. Cl.
*G02B 3/02* (2006.01)
*H04N 5/225* (2006.01)

(52) U.S. Cl. .................... 359/712; 348/340

(58) Field of Classification Search ............ 348/340; 359/619, 626, 708, 712
See application file for complete search history.

(56) References Cited

U.S. PATENT DOCUMENTS

| | | | |
|---|---|---|---|
| 6,212,012 B1 * | 4/2001 | Tanaka | 359/624 |
| 6,717,735 B2 | 4/2004 | Smith | |
| 6,842,297 B2 | 1/2005 | Dowski, Jr. | |
| 7,400,456 B2 | 7/2008 | Smith | |
| 7,405,883 B2 | 7/2008 | Hashimoto | |
| 7,498,558 B2 | 3/2009 | Sparrold et al. | |
| 7,692,709 B2 | 4/2010 | Robinson et al. | |
| 7,948,550 B2 * | 5/2011 | Robinson et al. | 348/335 |

* cited by examiner

*Primary Examiner* — David N Spector

(57) ABSTRACT

A lens structure includes a surface devoid of cusps that includes a seamless profile wherein the surface includes at least one segmented parabolic function forming a filtering surface for producing a controlled amount of spherical aberration.

20 Claims, 7 Drawing Sheets

LENS STRUCTURE HAVING LOW PASS FILTER CHARACTERISTIC

BACKGROUND

Lenses of all types may be found in a broad range of applications. A particular use of lenses is in illumination optics. One main purpose of lenses in illumination optics is to confine or direct light into a beam with a controlled angle, thereby directing the light into an intended area of illumination. One way to fulfill this purpose is to ensure that the beam does not have a wide angle.

U.S. Pat. No. 6,717,735 (hereafter the '735 patent), assigned to the assignee of the instant disclosure, and incorporated herein by reference as if fully set forth herein, discloses lens structures for flux redistribution and for optical low pass filtering. Embodiments of the lens structures discussed in the '735 patent include a lens structure that has a surface that includes a seamless profile, which is devoid of cusps. The surface includes a plurality convex elements and concave elements (e.g., an array of alternating convex elements and concave elements). The convex elements include a positive surface curvature area, and the concave elements include a negative surface curvature area. The lens structure can include a surface for producing a controlled amount of under-corrected spherical aberration and over-corrected spherical aberration in relation to a "prototype" surface. The prototype surface corresponds to an optimized sharp lens surface. The surface that defines the controlled amount of under-corrected spherical aberration and over-corrected spherical aberration is shaped according to an odd order polynomial function that when derived, results in an even order polynomial function that defines the lens surface having the spherical aberration. The under-corrected spherical aberration and the over-corrected spherical aberration do not alter the focal point of the lens, but results in an acceptable light flux redistribution.

U.S. Pat. No. 7,400,456 (hereafter the '456 patent), assigned to the assignee of the instant disclosure, and incorporated herein by reference as if fully set forth herein, builds on the lens structure of the '735 patent by introducing a lens structure defined by a cubic polynomial function. The cubic polynomial function evenly distributes the slope perturbation over the entire lens surface resulting in a symmetrical ring pattern of sag perturbations applied to a previously optimized sharp lens. The perturbations consisted of a sequence of segments of cubic polynomial radial functions merged in a continuous sag and slope at the boundary between segments. Each segment was a quarter or half wavelength of a wavy function. The resultant perturbation slope formed a "folded parabolic" function which had the property that each increment of surface slope departure from the optimized sharp lens has exactly the same amount of aperture area assigned to it, as does any other equal slope increment. A disadvantage of this structure is that the same amount of light is placed at the axial image focal point as is placed at the periphery of the deliberately fuzzy spot. This results in the center of the spot being brighter than the rim.

However, it would be desirable to maintain substantially constant light flux per unit area over the entire fuzzy image spot so that the center of the spot is not substantially brighter than the periphery.

SUMMARY

In an embodiment, a lens structure includes a surface devoid of cusps that includes a seamless profile wherein the surface includes at least one segmented parabolic function forming a filtering surface for producing a controlled amount of spherical aberration.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Lens structures for flux redistribution and optical low pass filtering are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
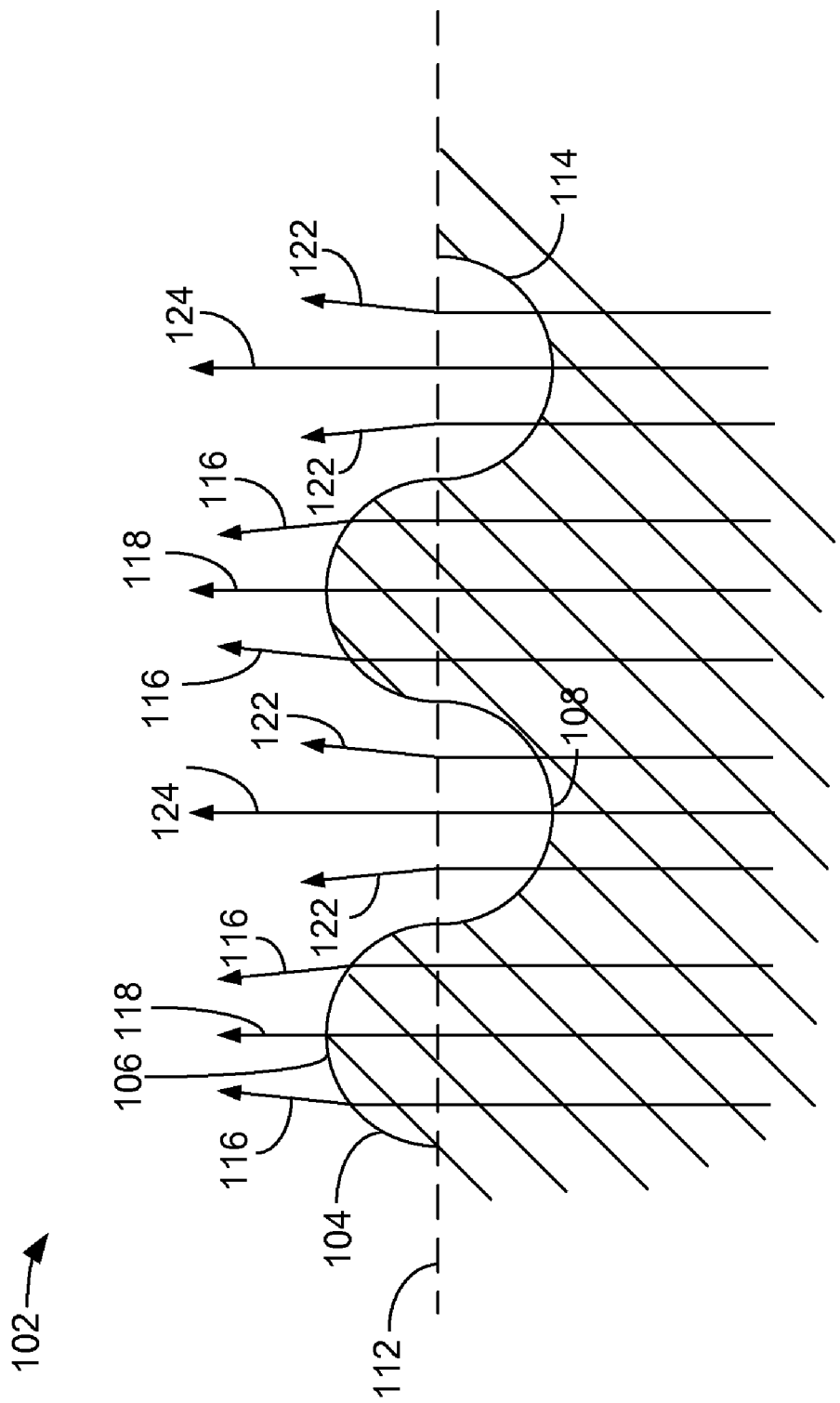
FIG. 1 is a diagram illustrating an embodiment of a lens structure.

FIG. 1 is a diagram illustrating an embodiment of a lens structure 102. Lens structure 102 includes a surface 104 that includes convex elements 106 and concave elements 108. The convex elements 106 and concave elements 108 are sag perturbations from an imaginary smooth surface, indicated at 112. Each of the convex elements 106 includes a positive surface curvature area relative to the smooth surface 112. Each of the concave elements 108 includes a negative surface curvature area relative to the smooth surface 112. Lens structure 102 refracts electromagnetic waves based on the slopes of convex elements 106 and concave elements 108.

Lens structure 102 can be part of a lens that refracts electromagnetic waves to provide a controlled amount of fuzziness or spherical aberration in the focal plane of the lens. With the controlled amount of fuzziness or spherical aberration, the lens operates as a low pass filter that passes low spatial frequency information. High spatial frequency information is stopped by the stop band of the lens.

In one embodiment, the shape of surface 104 is defined by at least one parabolic function to provide a filtering surface that produces a controlled amount of spherical aberration. The parabolic function will also be referred to as a "segmented" parabolic function because it defines a series of parabolic sections. The series of parabolic sections are seamlessly combined to define a lens structure. The controlled amount of spherical aberration produces a low pass filter with an improved stop band and a uniformly illuminated spot dimension. In one embodiment of an imaging system, the lens operates as a low pass filter that has an improved stop band to stop high frequency spatial information that exceeds the Nyquist frequency of the imaging system. The lens reduces aliasing in the imaging system and artifacts in the resulting image.

Surface 104 includes a seamless profile 114. The seamless profile 114 is continuous and has a defined slope at each point of surface 104. Seamless profile 114 does not include discontinuities, such as cusps.

Lens structure 102 refracts electromagnetic waves based on the lens material of the lens structure 102 and the slopes of convex elements 106 and concave elements 108. Each of the convex elements 106 refracts electromagnetic waves, indicated at 116, toward the optical axis 118 of the convex element 106. Each of the concave elements 108 refracts electromagnetic waves, indicated at 122, away from the optical axis 124 of the concave element 108. In one embodiment, lens structure 102 is made of plastic. In one embodiment, lens structure 102 is made of glass. In other embodiments, lens structure 102 can be made of any suitable material. In still another embodiment, the lens structure 102 can be formed using a thin film material.

Figure 2:
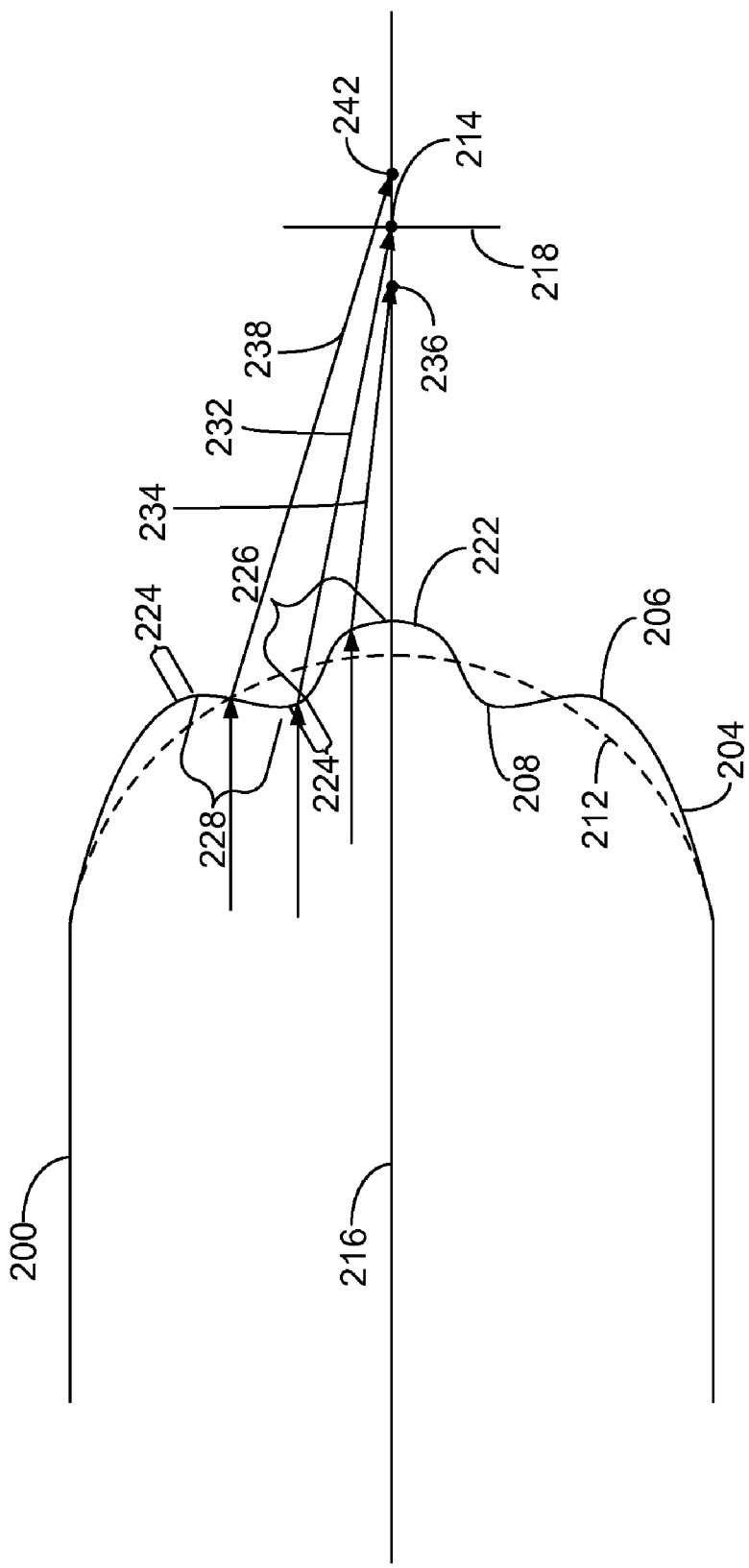
FIG. 2 is a diagram illustrating an embodiment of a lens.

FIG. 2 is a diagram illustrating an embodiment of a lens 200. Lens 200 includes a lens surface 204 that is similar to surface 104 (shown in FIG. 1). In one embodiment, lens surface 204 is disposed on the front side of lens 200. In one embodiment, lens surface 204 is disposed on the back side of the lens. In other embodiments, a lens surface similar to lens surface 204 can be disposed on any suitable surface and on more than one suitable surface of a lens.

Lens surface 204 includes convex elements 206 and concave elements 208. The convex elements 206 and concave elements 208 are sag perturbations from an imaginary un-filtered lens surface, indicated at 212. Imaginary un-filtered lens surface 212 is a smooth curved surface that corresponds to lens 200 prior to the generation of convex elements 206 and concave elements 208. Each of the convex elements 206 includes a positive surface curvature relative to imaginary un-filtered lens surface 212. Each of the concave elements 208 includes a negative surface curvature relative to imaginary un-filtered lens surface 212. The difference between imaginary un-filtered lens surface 212 and lens surface 204 can be defined by one or more mathematical expressions, referred to as sag equations.

Lens 200 projects electromagnetic waves onto a focal point 214 along an optical axis 216. The focal point 214 lies in a focal plane 218. Imaginary un-filtered lens surface 212 is curved to focus electromagnetic waves at focal point 214 and provide a minimum spot size in focal plane 218. Lens surface 204, including convex elements 206 and concave elements 208, also focuses electromagnetic waves from an object image into a minimum spot size in focal plane 218. In one embodiment, lens 200 and lens surface 204 are symmetrical about optical axis 216. In other embodiments, lens surface 204 is not symmetrical about optical axis 216. Also, in other embodiments, imaginary un-filtered lens surface 212 can be curved to provide a minimum spot size in any suitable focal plane.

Lens 200 includes convex elements 206 and concave elements 208 in a seamless profile 222. The seamless profile 222 has a defined slope at each point of lens surface 204. The slope of convex elements 206 and concave elements 208 of seamless profile 222 control the spot size in focal plane 218. Seamless profile 222 is continuous and does not include discontinuities, such as cusps. In one embodiment, seamless profile 222 is symmetrical about optical axis 216. In other embodiments, seamless profile 222 is not symmetrical about optical axis 216.

The difference between imaginary un-filtered lens surface 212 and seamless profile 222 can be defined by sag equations. In one embodiment, seamless profile 222 is defined by one or more parabolic functions to provide a filtering surface that produces a controlled amount of spherical aberration in focal plane 214 while also providing a uniformly illuminated spot dimension. The one or more parabolic functions are sag equations that define the sag of seamless profile 222. The controlled amount of spherical aberration operates as a low pass filter that passes low spatial frequency information and stops high spatial frequency information. The one or more parabolic functions define the seamless profile 222 to provide an improved stop band for lens 200, while also providing a spot on the focal plane 218 that is substantially uniformly illuminated from a center of a spot to the periphery of the spot.

Seamless profile 222 includes properly corrected zones 224, under corrected zones 226, and over corrected zones 228. Properly corrected zones 224 are essentially parallel to the imaginary un-filtered lens surface 212 and include minimal over corrected spherical aberrations and minimal under corrected spherical aberrations. Properly corrected zones 224 refract electromagnetic waves, indicated at 232, to focus the refracted electromagnetic waves 232 at focal point 214 in focal plane 218. Under corrected zones 226 refract electromagnetic waves, indicated at 234, to cross optical axis 216 at point 236 in front of focal plane 218. Over corrected zones 228 refract electromagnetic waves, indicated at 238, to cross optical axis 216 at point 242 behind focal plane 218.

Lens 200 refracts electromagnetic waves 232, 234, and 238 based on the lens material of lens 200 and the slopes of convex elements 206 and concave elements 208. In one embodiment, seamless profile 222 includes convex elements 206 and concave elements 208 that slope between a minimum slope and a maximum slope, where the magnitude of the minimum slope is essentially equal to the magnitude of the maximum slope. In one embodiment, the surface area with one slope on lens surface 204 is essentially equal to the surface area with any other slope on lens surface 204. With uniform surface area versus slope characteristics, lens surface 204 refracts electromagnetic waves to evenly distribute the refracted electromagnetic waves in focal plane 218. This even distribution of refracted electromagnetic waves maintains focal plane 218 in the same place and reduces high spatial frequency components to improve the stop band response of lens 200. Forming the seamless profile 222 of the lens surface 204 in accordance with one or more parabolic functions also has the effect of substantially uniformly illuminating a spot on the focal plane 218 that is cast by the electromagnetic waves 232, 234, and 238.

Figure 3:
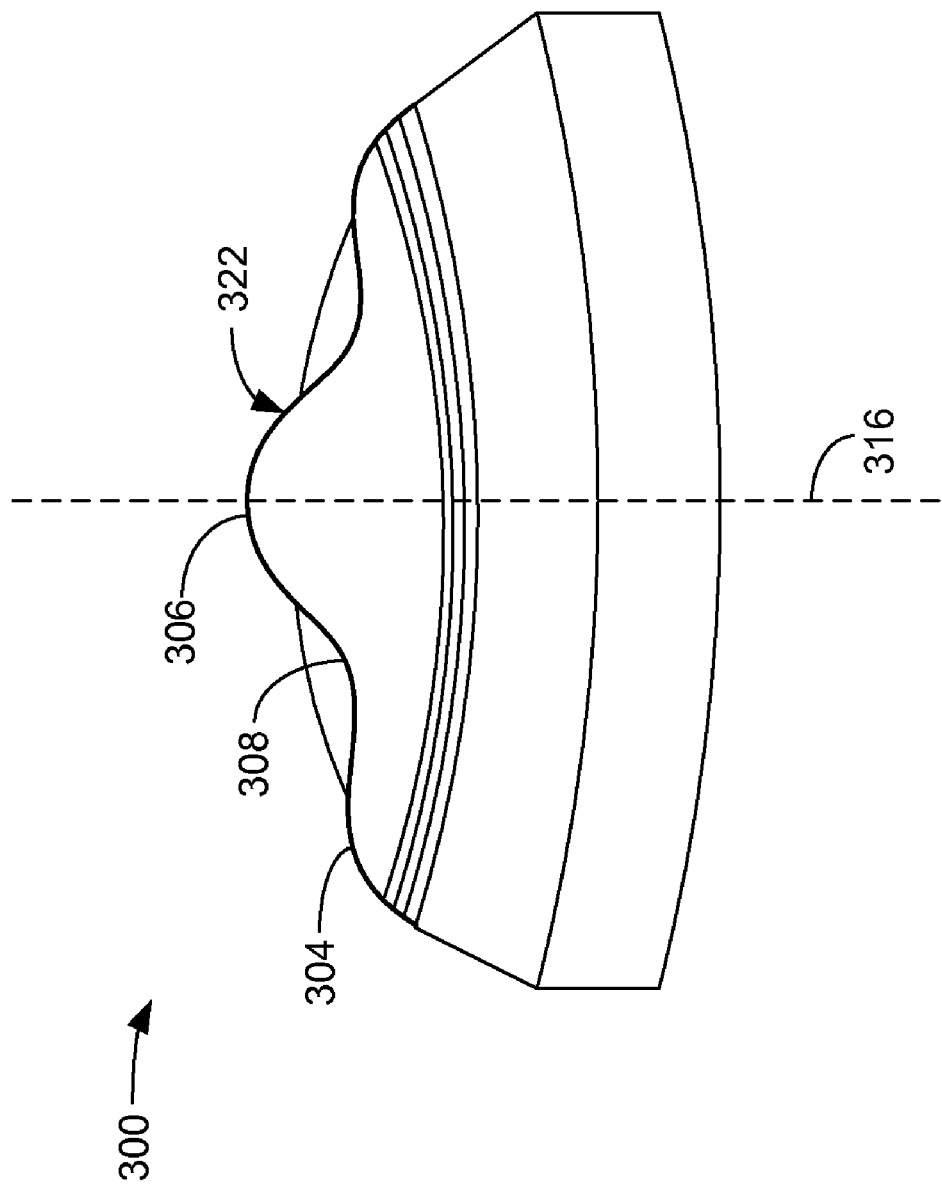
FIG. 3 is a diagram illustrating a perspective view of a portion of the lens of FIG. 2.

FIG. 3 is a diagram illustrating a perspective view of a portion of the lens of FIG. 2. Element in FIG. 3 that correspond to elements in FIG. 2 will be referred to using the nomenclature 3XX, where "XX" in FIG. 3 refers to a corresponding element in FIG. 2. The lens 300 illustrates a highly exaggerated view of a surface 304 showing the seamless profile 322 of the lens 300. The optical axis is shown at 316 for reference. The seamless profile 322 is formed using a series of convex elements 306 and concave elements 308 that radiate outward from the optical axis 316. The convex elements 306 and concave elements 308 are formed using one or more parabolic functions. In the example shown in FIG. 3, approximately one complete period of a parabolic function is illustrated as comprising the surface 304. More or fewer periods, or fractions of periods, of a parabolic function can be used to form the surface 304.

Figure 4:
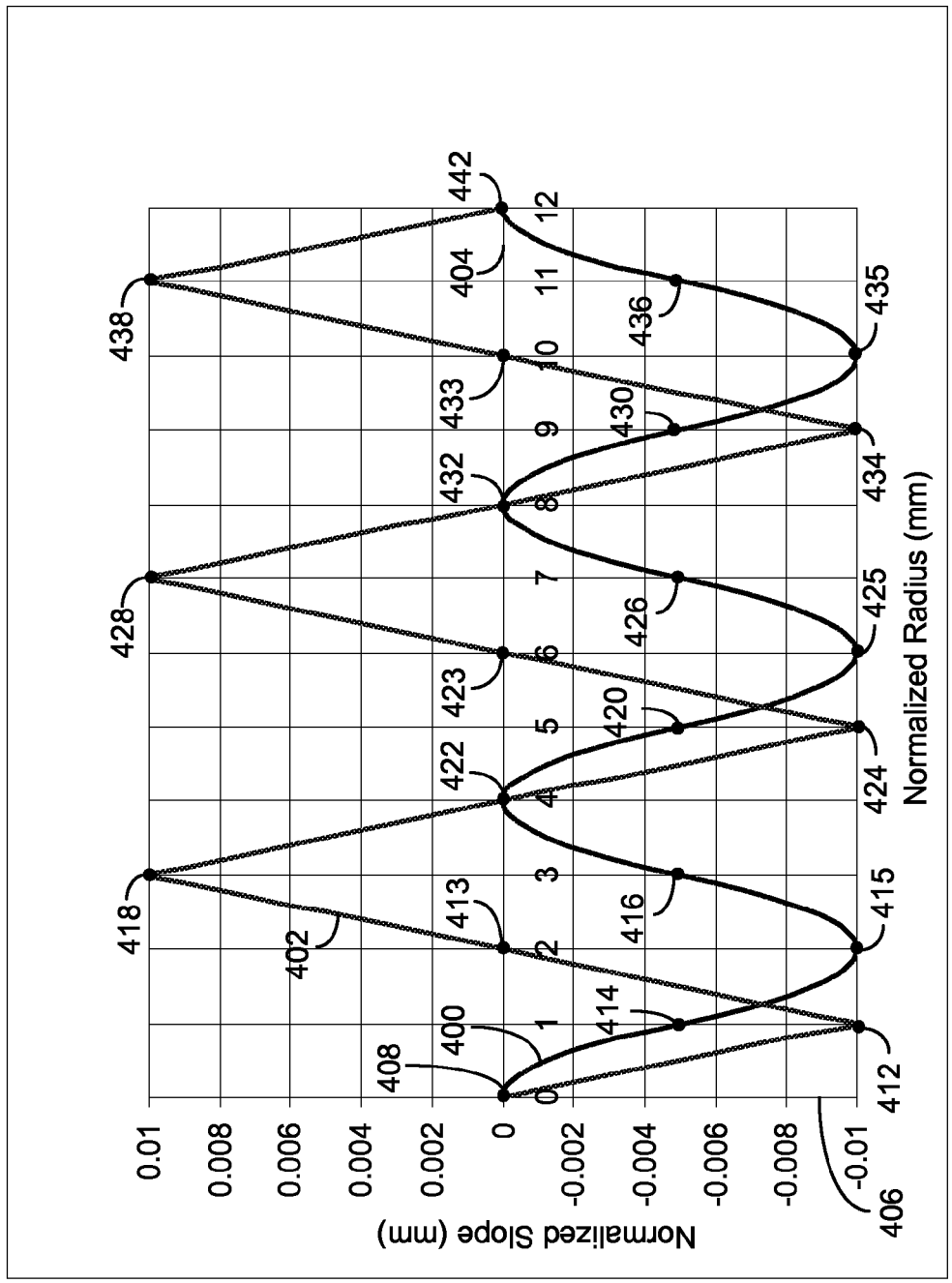
FIG. 4 is a plot diagram illustrating surface sag and surface sag slope, which provide improved high spatial frequency stop band characteristics and substantially uniform focal plane spot size illumination in a lens.

FIG. 4 is a plot diagram illustrating surface sag 400 and surface sag slope 402, which provide improved high spatial frequency stop band characteristics and substantially uniform focal plane spot size illumination in a lens. Surface sag 400 is defined by a family of parabolic equations described in detail herein. Surface sag slope 402 is at a slope value of zero (0) at the optical axis of the lens. In other embodiments, surface sag slope 402 can be at any suitable slope value at the optical axis of the lens. Also, in other embodiments, surface sag 400 and surface sag slope 402 can be defined by any suitable parabolic equation or family of parabolic equations.

Surface sag 400 is similar to the seamless profile of a lens surface in a lens, such as seamless profile 222 (shown in FIG. 2) and seamless profile 322 (shown in FIG. 3). Surface sag slope 402 is the slope of surface sag 400. Surface sag 400 can be disposed on a smooth lens surface, such as unfiltered lens surface 212 (shown in FIG. 2), to produce the seamless profile of the lens surface.

Surface sag 400 and surface sag slope 402 are symmetric about the optical axis of the lens. Surface sag 400 and surface sag slope 402 are plotted from the optical axis (216 in FIG. 2) of the lens along a radius leading away from the optical axis. The radial distance or radius is plotted along the x axis at 404 as a normalized radius value in millimeters (mm). Magnitudes of surface sag 400 and surface sag slope 402 are plotted along the y axis at 406 as normalized magnitudes in mm.

Surface sag 400 is defined by a family of sag equations. Each sag equation in the family of sag equations is a parabolic function that defines a portion, or segment, of surface sag 400, such as a half cycle of surface sag 400. Adjacent portions of surface sag 400 are defined by different sag equations in the family of sag equations. The resulting surface sag 400 and corresponding lens surface are continuous in magnitude and slope at the boundary between adjacent portions. However, the second derivative of the sag equations changes at each boundary. The family of sag equations expresses the difference or deviations in a lens surface having surface sag 400 from a smooth surface, such as unfiltered lens surface 212 (shown in FIG. 2).

Surface sag 400 has an oscillating form that has a maximum sag value of 0 at point 408 at the optical axis or normalized radius of 0. Surface sag slope 402 has a minimum slope value of 0 at point 408 and a negative maximum slope value of −0.01 at 412. The first quarter cycle of surface sag 400 is defined from point 408 at a radius of 0 to point 414 at a normalized radius of 1 by the following Equation 1.

$$0<R<R_0 S=-kR^2 \qquad \text{Eq. 1}$$

The value of $R_0$ is 1.0 and covers the first quarter cycle from point 408 to point 414.

The radius plotted along the x axis 404 is normalized with respect to R0, where R0 is the radius at the first maximum slope value of −0.01 at point 412 of surface sag slope 402. The value k is common to all equations in the family of sag equations and determines the radial scale of surface sag 400.

Surface sag 400 falls from a sag value of approximately 0 at 408 to a sag value of approximately −0.005 at point 414, which represents the first quarter cycle of surface sag 400. At point 412, the surface sag slope 402 achieves a maximum slope value of −0.01. The point 412 of surface sag slope 402 coincides with the normalized radius of 1 at point 414 of surface sag 400.

The next half cycle of surface sag 400 is defined from the normalized radius of 1 at point 414 to a normalized radius of 3 at point 416 by the following Equation 2.

$$R_0<R<R_1 S=kR^2-1(4kR_0)+2kR_0^2\{1^2\} \qquad \text{Eq. 2}$$

In equation 2, $R_1$ has the value 3.0 and covers the next half cycle from point 414 to point 416 of surface sag 400. Surface sag 400 falls from a sag value of approximately −0.005 at point 414, through a minimum of −0.01 at point 415, and then rises to a sag value of approximately −0.005 at point 416. Surface sag slope 402 rises from the maximum negative slope value of approximately −0.01 at point 412 to a slope value of 0 at point 413 and then continues to a positive maximum slope value of approximately 0.01 at point 418. At the radius of 3, surface sag slope 402 is at a second maximum slope value of about 0.01 at point 418 and surface sag 400 has a sag value of about −0.005 at point 416. The magnitudes of the maximum negative slope value at point 412 and the maximum positive slope value at point 418 are substantially the same.

The next half cycle of surface sag 400 is defined from the normalized radius of 3 at point 416 to a normalized radius of 5 at point 420 by the following Equation 3.

$$R_1<R<R_2 S=-kR^2+2(4kR_0)-2kR_0^2\{3^2-1^2\} \qquad \text{Eq. 3}$$

In equation 3, $R_2$ has the value 5.0 and covers the next half cycle from point 416 to point 420 of surface sag 400. Surface sag 400 rises from a sag value of approximately −0.005 at point 416 to a maximum sag value of approximately 0 at point 422 and then falls to an approximate value of −0.005 at point 420. Surface sag slope 402 falls from the maximum positive slope value of approximately 0.01 at point 418 to a slope value of 0 at point 422 and then continues to a second maximum negative slope value of approximately −0.01 at point 424. At the radius of 5, surface sag slope 402 falls to the second maximum negative slope value of −0.01 at point 424 and surface sag 400 has an approximate sag value of approximately −0.005 at point 420. The magnitudes of the maximum negative slope values at points 412 and 424 are substantially the same.

The next half cycle of surface sag 400 is defined from the normalized radius of 5 at point 420 to a normalized radius of 7 at point 426 by the following Equation 4.

$$R_2<R<R_3 S=kR^2-3(4kR_0)+2kR_0^2\{5^2-3^2+1^2\} \qquad \text{Eq. 4}$$

In equation 4, $R_3$ has the value 7.0 and covers the next half cycle from point 420 to point 426 of surface sag 400. Surface sag 400 falls from a sag value of approximately −0.005 at point 420, through a minimum of −0.01 at point 425, and then rises to a sag value of approximately −0.005 at point 426. Surface sag slope 402 rises from the maximum negative slope value of approximately −0.01 at point 424 to a slope value of 0 at point 423 and then continues to a positive maximum slope value of approximately 0.01 at point 428. At the radius of 7, surface sag slope 402 is at a second maximum slope value of about 0.01 at point 428 and surface sag 400 has a sag value of about −0.005 at point 426. The magnitudes of the maximum positive slope values at points 418 and 428 are substantially the same.

The next half cycle of surface sag 400 is defined from the normalized radius of 7 at point 426 to a normalized radius of 9 at point 430 by the following Equation 5.

$$R_3<R<R_4 S=-kR^2+4(4kR_0)-2kR_0^2\{7^2-5^2+3^2-1^2\} \qquad \text{Eq. 5}$$

In equation 5, $R_4$ has the value 9 and covers the next half cycle from point 426 to point 430 of surface sag 400. Surface sag 400 rises from a sag value of approximately −0.005 at point 426 to a maximum sag value of approximately 0 at point 432 and then falls to an approximate value of −0.005 at point 430. Surface sag slope 402 falls from the maximum positive slope value of approximately 0.01 at point 428 to a slope value of 0 at point 432 and then continues to a third maximum negative slope value of approximately −0.01 at point 434. At the radius of 9, surface sag slope 402 falls to the third maximum negative slope value of −0.01 at point 434 and surface sag 400 has an approximate sag value of approximately −0.005 at point 430. The magnitudes of the maximum negative slope values at points 412, 424 and 434 are substantially the same.

The next half cycle of surface sag 400 is defined from the normalized radius of 9 at point 430 to a normalized radius of 11 at point 436 by the following Equation 6.

$$R_4 < R < R_5 \; S = kR^2 - 5(4kR_0) + 2kR_0^2 \{9^2 - 7^2 + 5^2 - 3^2 + 1^2\} \quad \text{Eq. 6}$$

In equation 6, $R_5$ has the value 11.0 and covers the next half cycle from point 430 to point 436 of surface sag 400. Surface sag 400 falls from a sag value of approximately −0.005 at point 430, through a minimum of −0.01 at point 435, and then rises to a sag value of approximately −0.005 at point 436. Surface sag slope 402 rises from the maximum negative slope value of approximately −0.01 at point 434 to a slope value of 0 at point 433 and then continues to a positive maximum slope value of approximately 0.01 at point 438. At the radius of 11, surface sag slope 402 is at a third maximum slope value of about 0.01 at point 438 and surface sag 400 has a sag value of about −0.005 at point 436. The magnitudes of the maximum positive slope values at points 418, 428 and 438 are substantially the same.

The next quarter cycle of surface sag 400 is defined from the normalized radius of 11 at point 436 to a normalized radius of 12 at point 442 by the following Equation 7.

$$R_5 < R < R_6 \; S = -kR^2 + 6(4kR_0) - 2kR_0^2 \{11^2 - 9^2 + 7^2 - 5^2 + 3^2 - 1^2\} \quad \text{Eq. 7}$$

In equation 7, $R_6$ has the value 12.0 and covers the next quarter cycle from point 436 to point 442 of surface sag 400. Surface sag 400 rises from a sag value of approximately −0.005 at point 436 to a maximum sag value of approximately 0 at point 442. Surface sag slope 402 falls from the maximum positive slope value of approximately 0.01 at point 438 to a value of 0 at point 442.

The series sum expansions in the final constant term of equations 2 through 7 are used to emphasize the iterative nature of the equation set; as is also the format for the middle linear (in R) terms. For equation 1, the same form can be used as is used in the equations 2 through 7, so the full expression becomes:

$$0 < R < R_0; \; S = -kR^2 + 0(4kR_0)R - 2kR_0^2 \{0^2\} \quad \text{Eq. 8}$$

As shown, the last two terms are identically zero.

To fully implement this equation set; the final radius ($R_6$) in this example, is normalized to the radius (a) of the aperture stop that will delineate the aperture of the filter. In addition, a number (n) of full cycles of surface ripple are assumed; so that the final radius comes out as (a).

Thus the first quarter cycle is defined by Equation 9 as follows:

$$R_0 = 1(a/4n), R_1 = 3(a/4n), R_2 = 5(a/4n), R_3 = 7(a/4n), R_4 = 9(a/4n), R_5 = 11(a/4n), R_6 = 12(a/4n) \quad \text{Eq. 9}$$

As clearly shown in FIG. 4, the sequence starts and ends with a quarter cycle at each end of the surface sag, with half cycles in between. Normalizing replaces the term ($4kR_0$) in Equations 1 through 8, with the term (ka/n) in Equation 9, and the term $2kR_0^2$ in Equations 1 through 8 becomes, $(a/n)^2 k/8$ in equation 9.

This substitution provides a working set of equations for (n) cycles in an aperture of radius (a) as follows.

$$0 < R < 1(a/4n); \; S = -kR^2 \quad \text{Eq. 10}$$

$$1(a/4n) < R < 3(a/4n); \; S = kR^2 - 1(ka/n)R + (a/n)^2 k/8\{1^2\} \quad \text{Eq. 11}$$

$$3(a/4n) < R < 5(a/4n); \; S = -kR^2 + 2(ka/n)R - (a/n)^2 k/8\{3^2 - 1^2\} \quad \text{Eq. 12}$$

$$5(a/4n) < R < 7(a/4n); \; S = kR^2 - 3(ka/n)R + (a/n)^2 k/8\{5^2 - 3^2 + 1^2\} \quad \text{Eq. 13}$$

$$7(a/4n) < R < 9(a/4n); \; S = -kR^2 + 4(ka/n)R - (a/n)^2 k/8\{7^2 - 5^2 + 3^2 - 1^2\} \quad \text{Eq. 14}$$

$$9(a/4n) < R < 11(a/4n); \; S = kR^2 - 5(ka/n)R + (a/n)^2 k/8\{9^2 - 7^2 + 5^2 - 3^2 + 1^2\} \quad \text{Eq. 15}$$

$$11(a/4n) < R < 12(a/4n); \; S = -kR^2 + 6(ka/n)R - (a/n)^2 k/8\{11^2 - 9^2 + 7^2 - 5^2 + 3^2 + 1^2\} \quad \text{Eq. 16}$$

Therefore, the set of segment equations 10 through 16 provides (n=3 in this example) complete cycles in an aperture of radius (a). As clearly illustrated, the pattern shows how to extend the set for any number of cycles.

Although it is preferred to implement a set of complete cycles starting and ending with a quarter cycle, it is also possible to implement an integral number of half cycles starting and ending with a quarter cycle. Further, it is also possible to reverse all the signs and have a similar surface that starts with a concave element in the center, rather than a convex element.

A half cycle that spans the bottom of a trough to the top of a crest, or the reverse, will produce the full range of over-corrected and under-corrected spherical aberration to maintain a fixed focal plane.

Generally, a range of two to four cycles should suffice for many applications; but any number of at least two half cycles will achieve the same spot size and illumination; though better performance comes with a larger number of cycles. Beyond four full cycles, the benefit of more cycles may be overridden by the tooling costs of forming more ripples in the lens surface.

Figure 5:
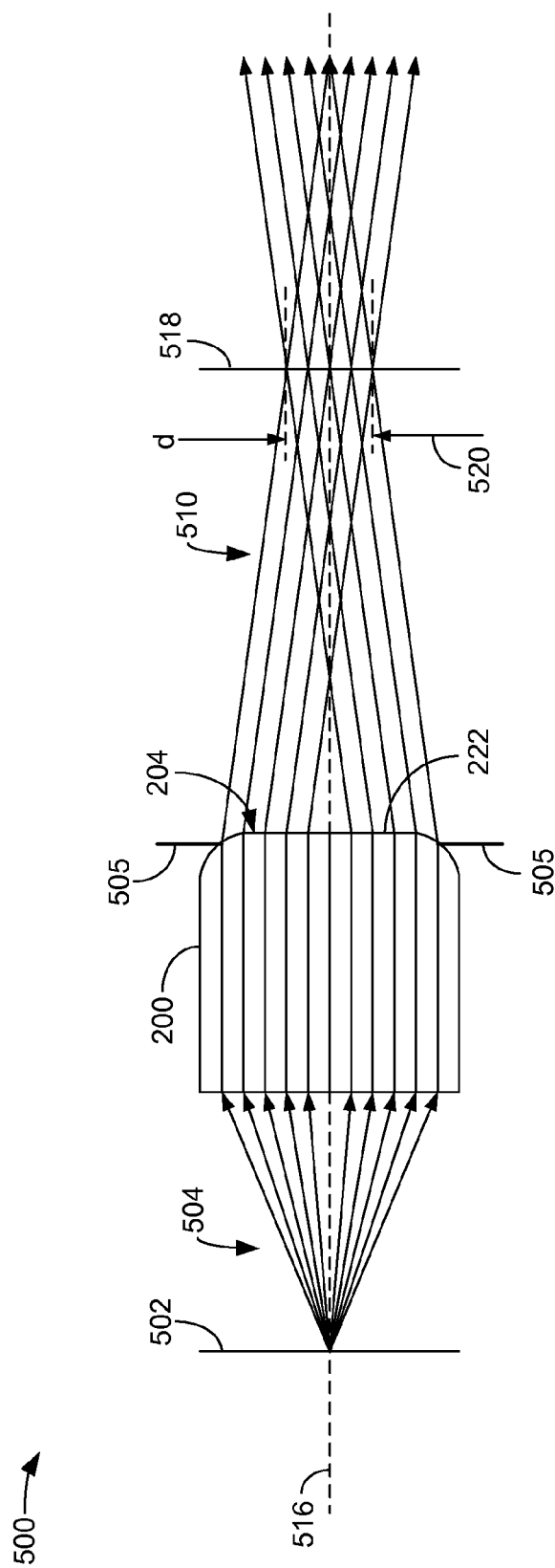
FIG. 5 is a ray plot of the lens of FIG. 2 having a surface that includes the seamless profile defined by a parabolic function

FIG. 5 is a ray plot of the lens 200 of FIG. 2 having a surface 204 that includes the seamless profile 222 defined by a segmented parabolic function. Electromagnetic waves 504 emanating from a source plane 502 enter the lens 200. The seamless profile 222 of the surface 204 includes an aperture stop 505, which defines an outer periphery of the seamless profile 222. The seamless profile 222 refracts the electromagnetic waves 504 resulting in refracted electromagnetic waves 510. Refracted electromagnetic waves 510 include refracted electromagnetic waves that pass through one or more properly corrected zones (224 of FIG. 2) of the surface 204; refracted electromagnetic waves that pass through one or more under corrected zones (226 of FIG. 2) of the surface 204; and refracted electromagnetic waves that pass through one or more over corrected zones (228 of FIG. 2) of the surface 204. As a result of the refracted electromagnetic waves passing through the properly corrected zones, under corrected zones and over corrected zones formed using the above-described segmented parabolic function, the focal plane 518 is illuminated with a spot 520 having a diameter "d." The spot 520 is substantially uniformly illuminated from a center of the spot 520 to a periphery of the spot 520.

Figure 6:
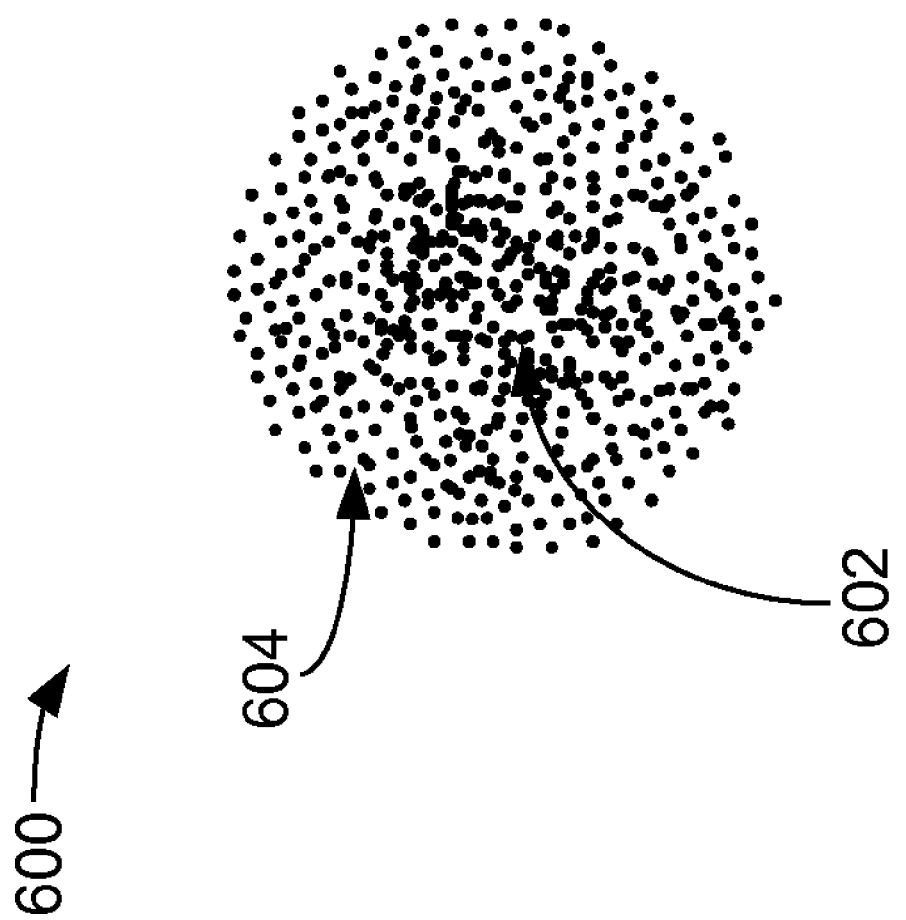
FIG. 6 is a diagram illustrating the substantially uniform illumination of the sot of FIG. 5.

FIG. 6 is a diagram illustrating the substantially uniform illumination of the spot of FIG. 5. The spot 600 includes substantially uniform illumination from a center 602 to a periphery 604.

Figure 7:
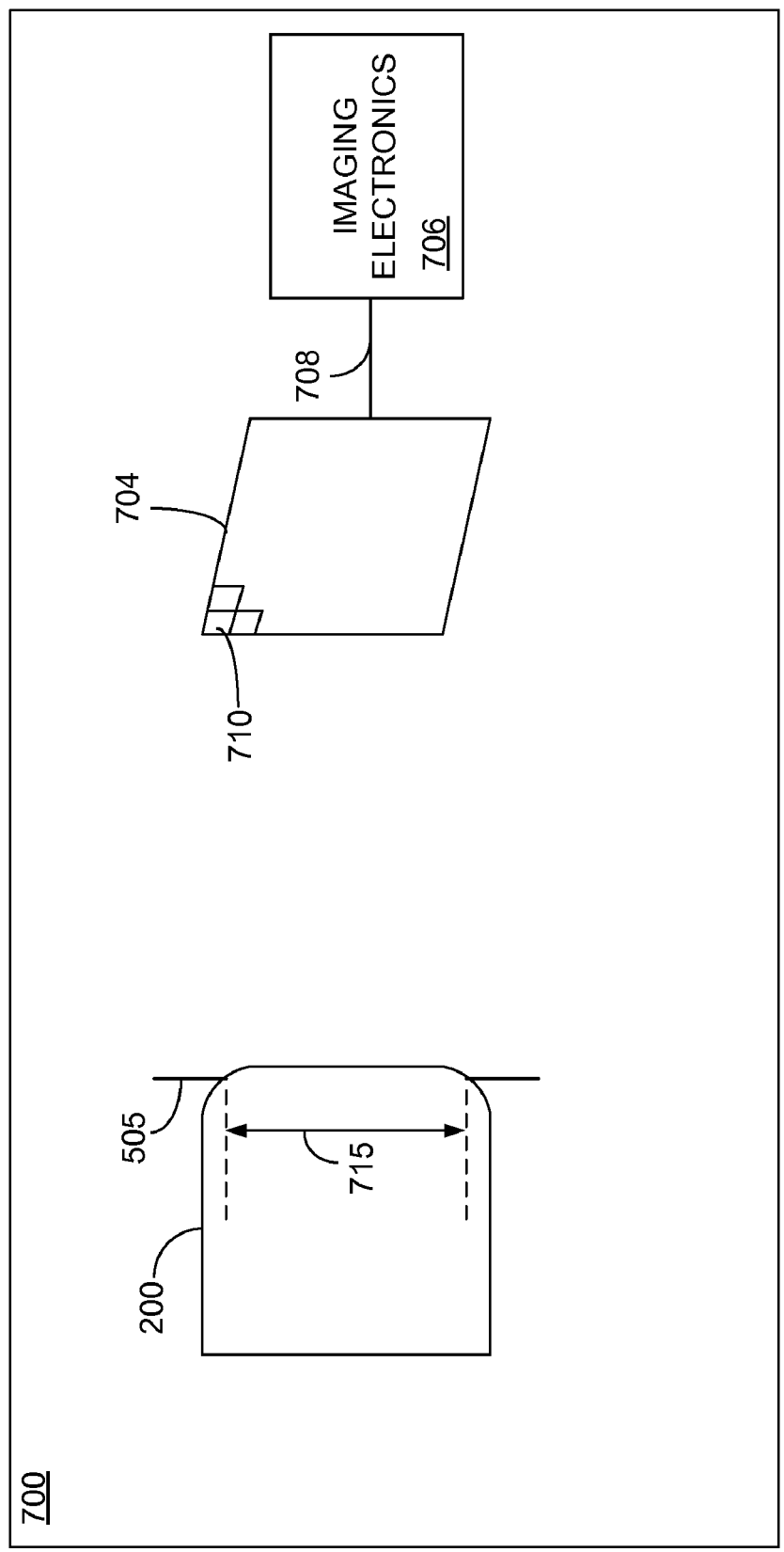
FIG. 7 is a diagram illustrating an embodiment of an imaging system that includes a lens having surface sag, such as the surface sag shown in FIG. 4.

FIG. 7 is a diagram illustrating an embodiment of an imaging system 700 that includes a lens 200 having surface sag, such as surface sag 400 (shown in FIG. 4). Imaging system 700 can be a digital imaging system, such as a digital still camera, a digital video camera or an optical navigation computer mouse. Imaging system 700 includes lens 200, an image sensor 704, and imaging system electronics 706. Image sensor 704 is situated in the focal plane of lens 200 and is coupled to imaging system electronics 706 via conductive path 708.

Image sensor 704 includes photo detectors 710 that convert electromagnetic waves into corresponding digital signals. Each of the photo detectors 710 corresponds to a pixel in a resulting image. In an embodiment, image sensor 704 can be a charge couple device (CCD). In another embodiment, image sensor 704 can be a complimentary metal oxide semiconductor (CMOS) array imaging device. In other embodiments, image sensor 704 can be any suitable image sensing device.

Lens 200 receives electromagnetic waves, such as light, from an object image and focuses electromagnetic waves on image sensor 704. Image sensor 704 receives the focused electromagnetic waves and converts the focused electromagnetic waves into digital signals. Imaging system electronics 706 receives and processes the digital signals.

Imaging system 700 is a sampling device that samples object image information in space. The spatial sampling rate of imaging system 700 is dependent on the size and spacing of photo detectors 710 in image sensor 704. For example, if the centers of photo detectors 710 are spaced at 10 microns, the sampling rate is 100 samples per mm. The Nyquist criteria states that when the information to be captured contains frequencies that are greater than one half the sampling rate of the device, the resulting captured image can include aliasing errors and artifacts or false information. Thus, if imaging system 700 samples at a rate of 100 samples per mm and the object image information presented to image sensor 704 contains high spatial frequency information greater than 50 samples per mm, aliasing errors can occur and artifacts or erroneous information may be contained in the resulting image. Furthermore, these errors or artifacts cannot be removed from the resulting image and the artifacts render the resulting image with noticeable noise or other undesirable and unsightly features.

One design consideration in a digital imaging system, such as imaging system 700, is to ensure compliance with the Nyquist criteria. Optics, such as the lens 200, can be employed to filter out high spatial frequency information, such that the object image information presented to image sensor 704 meets the Nyquist criteria. A lens that includes surface sag, such as surface sag 400 (shown in FIG. 4) provides a low cost, functional, anti-aliasing filter without using expensive birefringent materials, such as crystalline structures.

In an embodiment, lens 200 includes surface sag 400 situated in the plane of an aperture stop 505. The aperture stop 505 is imaged as the exit pupil 715 of lens 200. The spot size of the object image on imaging sensor 704 is determined by lens 200 and the slopes of surface sag 400.

In imaging systems that have a smooth lens, the sharpness of an object image increases as the aperture is stopped down. In contrast, in imaging system 700 that includes the lens 200 with surface sag 400, the lens 200 and surface sag 400 controls the fuzziness of the object image, essentially independent of the aperture size. The lens 200 having surface sag 400 filters out high spatial frequency information to provide a blurred or fuzzy image independent of the aperture size by employing portions of the lens surface area to create over corrected spherical aberration and under correction spherical aberration. The aperture can be stopped down by half cycle increments to include only one half cycle of surface sag 400 without changing the modulation transfer function of the lens, which still produces a uniform distribution of surface area verses slope. This uniform distribution of surface area versus slope provides the blurred or fuzzy image that does not contain filtered out high spatial frequency information.

Surface sag, such as surface sag 400 (shown in FIG. 4) can be placed on a separate flat surface or lens. Alternatively, the surface sag can be added to the curved profile of an existing surface in an appropriate location. The lens 200 including surface sag, such as surface sag 400, provides an improved high spatial frequency stop band characteristic that prevents high spatial frequencies from being presented to the image sensor, such as image sensor 704. Filtering out the high spatial frequency information reduces aliasing and artifacts in the resulting image. Also, the lens including surface sag, such as surface sag 400, provides optical filtering essentially without dependence on the f-number of the aperture.

This disclosure describes the invention in detail using illustrative embodiments. However, it is to be understood that the invention defined by the appended claims is not limited to the precise embodiments described.

What is claimed is:

1. A lens structure comprising: a surface devoid of cusps that includes a seamless profile wherein the surface includes at least one segmented parabolic function forming a filtering surface for producing a controlled amount of spherical aberration, the segmented parabolic function comprising at least two half-cycles bounded by at least two quarter cycles, each half-cycle being symmetric with respect to any other half-cycle.

2. The lens structure of claim 1, further comprising:
   a first outer lens surface configured to receive light waves incident thereon;
   a second outer lens surface configured to transmit light waves transmitted through the lens structure from the first lens surface; and
   a changeable aperture operably associated with the lens, wherein at least one of the first outer lens surface and the second outer lens surface is defined by the seamless profile comprising a plurality of adjoining concave and convex segments having sag perturbations disposed therealong, the seamless profile and sag perturbations being configured to reduce spatial aliasing in an image produced by the lens along a focal plane associated therewith so as to pass predetermined lower spatial frequencies and reject predetermined higher spatial frequencies, the lens, the first and second outer lens surfaces, and the aperture having an optical axis associated therewith, each of the plurality of adjoining segments being defined by a parabolic function unique thereto and being rotationally symmetric in respect of the optical axis, the first and second outer lens surfaces being symmetric about the optical axis, the sag perturbations being configured to provide a controlled amount of spherical aberration such that the amount of spherical aberration provided by the lens is substantially independent of changes in the aperture.

3. The lens structure of claim 2, wherein the seamless profile has between 1 and 8 half cycles of sag perturbations disposed therealong.

4. The lens structure of claim 2, wherein the seamless profile further includes at least one of one quarter cycle of sag perturbations and one half cycle of sag perturbations disposed therealong.

5. The lens structure of claim 2, wherein the sag perturbations have maximum slopes and minimum slopes of substantially the same magnitude.

6. The lens structure of claim 2, wherein first portions of the lens are configured to over-correct for spherical aberration and second portions of the lens are configured under-correct for spherical aberration.

7. The lens structure of claim 2, wherein the seamless profile follows a first parabolic function and a second parabolic function in a family of parabolic functions having the same slope at a selected radius value in respect of the optical axis.

8. The lens structure of claim 2, wherein the seamless profile follows a first parabolic function and a second parabolic function in a family of parabolic functions having the same magnitude at a selected radius value in respect of the optical axis.

9. The lens structure of claim 2, wherein the spherical aberration produced by at least portions of the lens is under-corrected.

10. The lens structure of claim 2, wherein the spherical aberration produced by at least portions of the lens is over-corrected.

11. A method for forming a lens structure, comprising:
forming a surface devoid of cusps that includes a seamless profile, wherein the surface is defined by a segmented parabolic function comprising at least two half-cycles bounded by at least two quarter cycles, each half-cycle being symmetric with respect to any other half-cycle, the surface forming a filtering surface for producing a controlled amount of spherical aberration.

12. The method of claim 11, further comprising:
providing a first outer lens surface configured to receive light waves incident thereon;
providing a second outer lens surface configured to transmit light waves transmitted through a lens from the first outer lens surface; and
providing an aperture operably associated with the lens, wherein at least one of the first outer lens surface and the second outer lens surface is defined by a seamless profile comprising a plurality of adjoining concave and convex segments having sag perturbations disposed therealong, the seamless profile and sag perturbations being configured to at least one of reduce spatial aliasing and increase spherical aberration in an image produced by the lens along a focal plane associated therewith so as to pass predetermined lower spatial frequencies and reject predetermined higher spatial frequencies, the lens, the first and second outer lens surfaces and the aperture having an optical axis associated therewith, each of the plurality of adjoining segments being defined by a parabolic function unique thereto and being rotationally symmetric in respect of the optical axis, the first and second outer lens surfaces being symmetric about the optical axis, the sag perturbations being configured to provide a controlled amount of spherical aberration such that the amount of spherical aberration provided by the lens is substantially independent of changes in the aperture.

13. The method of claim 12, further comprising over-correcting spherical aberration in an image produced by the lens.

14. The method of claim 12, further comprising under-correcting spherical aberration in an image produced by the lens.

15. The method of claim 12, further comprising providing first portions of the lens to over-correct for spherical aberration and providing second portions of the lens to under-correct for spherical aberration.

16. A lens structure comprising:
a surface devoid of cusps that includes a seamless profile wherein the surface includes at least one segmented parabolic function forming a filtering surface for producing a controlled amount of spherical aberration, the segmented parabolic function comprising at least two half-cycles bounded by at least two quarter cycles, each half-cycle being symmetric with respect to any other half-cycle; and
a changeable aperture operably associated with the lens structure, wherein a surface of the lens structure is defined by the seamless profile comprising a plurality of adjoining concave and convex segments having sag perturbations disposed therealong, the seamless profile and sag perturbations being configured to reduce spatial aliasing in an image produced by the lens along a focal plane associated therewith so as to pass predetermined lower spatial frequencies and reject predetermined higher spatial frequencies.

17. The lens structure of claim 16, wherein the seamless profile has between 1 and 8 half cycles of sag perturbations disposed therealong.

18. The lens structure of claim 16, wherein the seamless profile further includes at least one of one quarter cycle of sag perturbations and one half cycle of sag perturbations disposed therealong.

19. The lens structure of claim 16, wherein first portions of the lens structure are configured to over-correct for spherical aberration and second portions of the lens are configured under-correct for spherical aberration.

20. The lens structure of claim 16, wherein the seamless profile follows a first parabolic function and a second parabolic function in a family of parabolic functions having the same slope at a selected radius value in respect of the optical axis.

* * * * *